INVENTOR
JACK N. SHUMAN

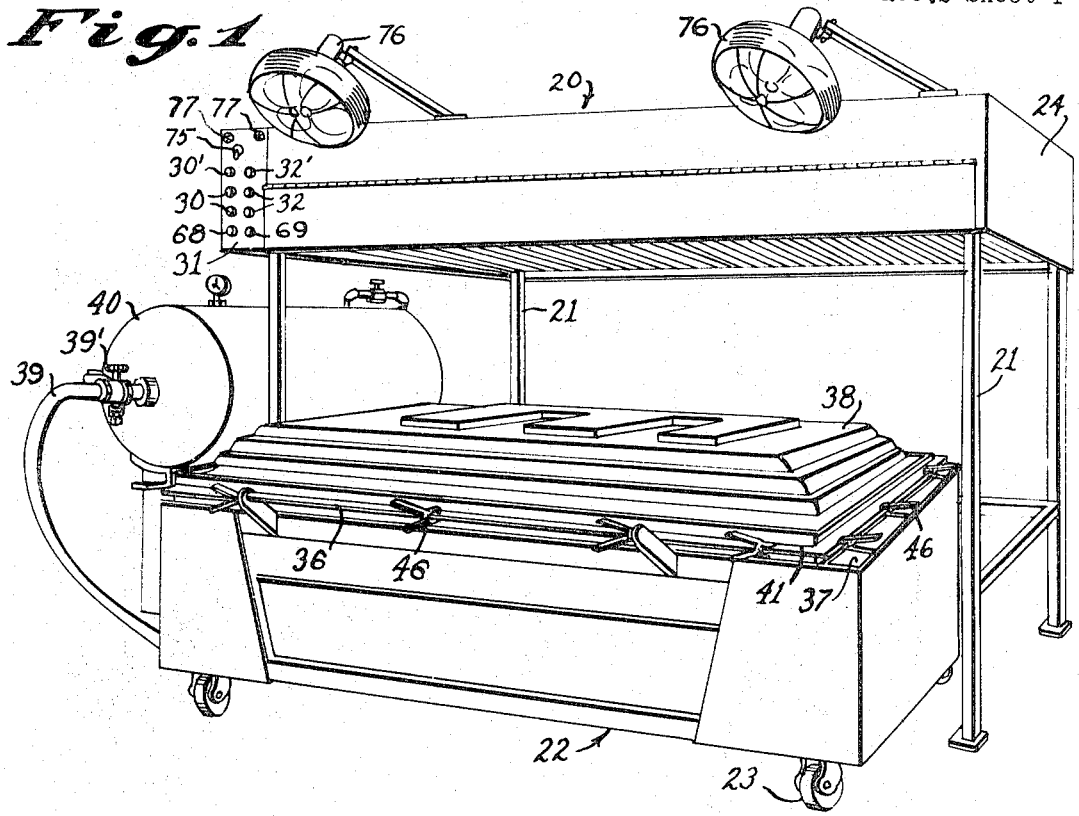
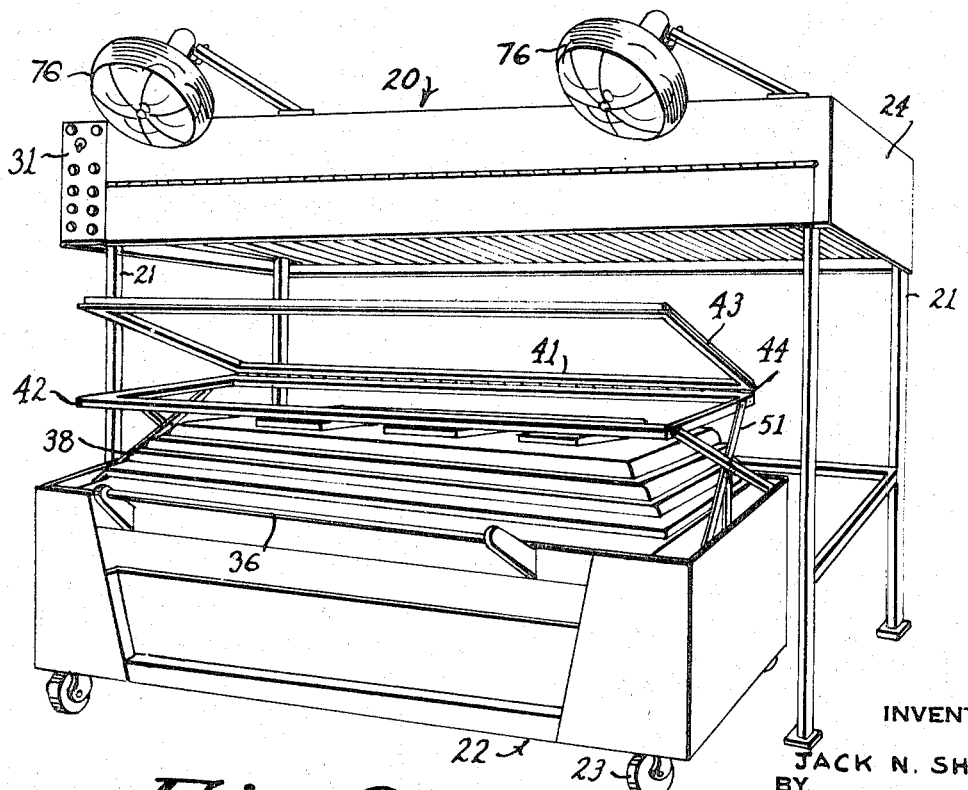

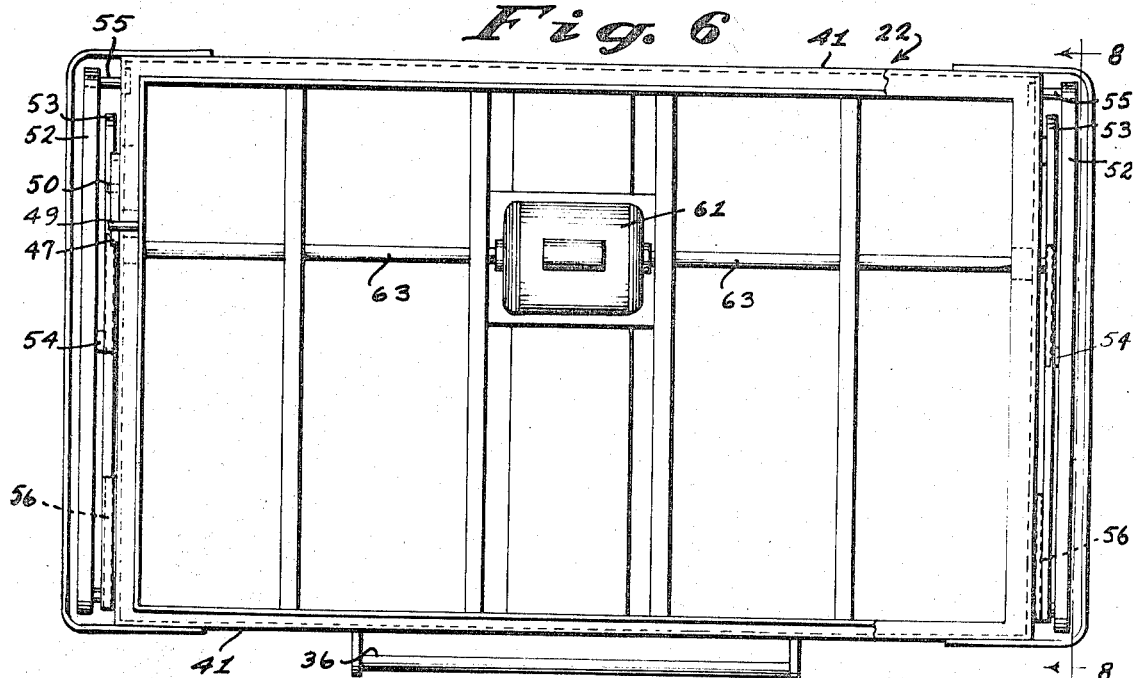
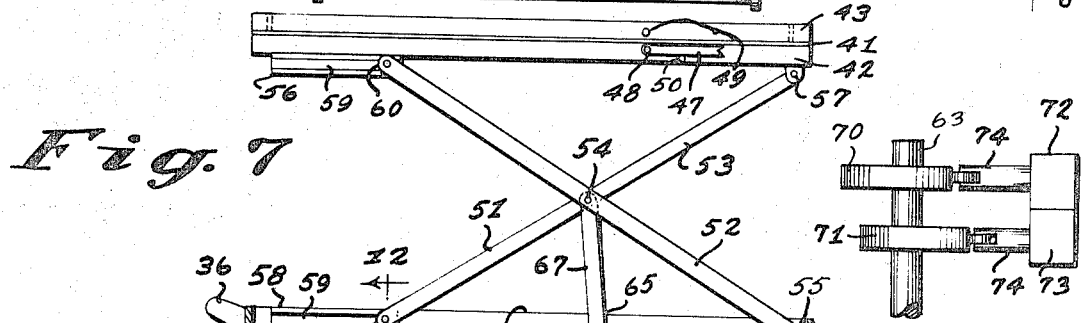
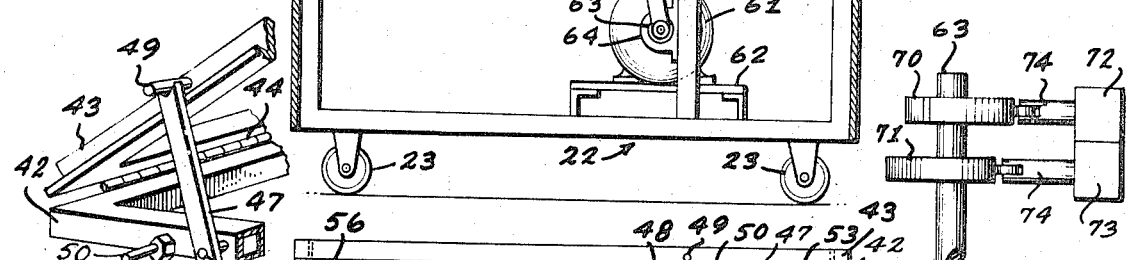
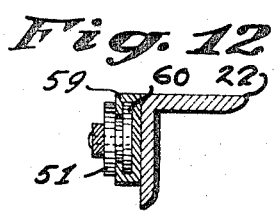
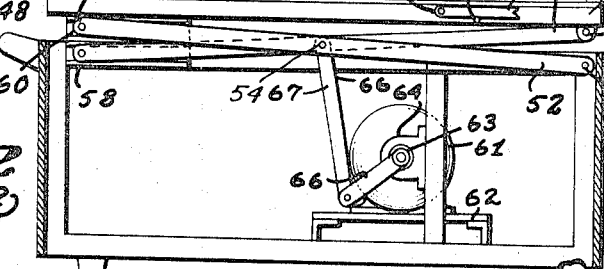

United States Patent Office 3,553,784
Patented Jan. 12, 1971

3,553,784
APPARATUS FOR FORMING PLASTIC MATERIAL
Jack N. Shuman, 126 W. Tremont Ave.,
Charlotte, N.C. 28203
Filed Dec. 14, 1967, Ser. No. 690,665
Int. Cl. B29c *17/00*
U.S. Cl. 18—19
1 Claim

ABSTRACT OF THE DISCLOSURE

Method and apparatus for forming plastic material including the provision of an elevated heating oven, a contoured forming mold, an open frame member constructed for supporting a sheet of plastic material and normally disposed at a position peripherally surrounding the lower portion of the forming mold, and a mounting and drive arrangement for the frame member that permits it to be automatically raised from its normal position to a selected intermediate position for loading the plastic sheet therein, then raised further to a predetermined upper position at which the sheet may be heated by the elevated heating oven, and then lowering the frame immediately following heating and while still under the oven to its normal position at which the sheet of plastic material is caused to conform to the contours of the mold.

BACKGROUND OF THE INVENTION

It is desirable for many purposes to have available equipment capable of forming plastic into a variety of shapes for use in signs or other articles in limited quantities; that is, quantities which would not justify large-scale, mass production operations. Such equipment, to be economically feasible, must be comparatively inexpensive and capable of being operated by a minimum number of personnel that need not be highly trained.

Equipment capable of forming plastic material is presently available, and it consists essentially of an elevated heating oven, a forming mold supporting carriage table that can be moved between a location beneath the oven and a displaced position, and a frame member on which a sheet of plastic is clamped, the frame member being manualy movable with respect to the vacuum table and forming mold to permit the plastic sheet to be first heated by the oven until plasticized and then drawn over the forming mold. However, while this presently available equipment operates satisfactorily in producing the desired molded articles, it also has some drawbacks, primarily as a result of the mounting arrangement for the movable frame member.

This frame member mounting arrangement consists of four vertically disposed posts positioned at the four corners of the rectangular frame member and slidably received in the forming table to permit the frame member to be manually raised to a predetermined upper position at which it is loaded with a plastic sheet and then moved with the forming table beneath the elevated heating oven, and then, after the plastic has been heated, removed from under the oven with the forming table and manually lowered to a predetermined lower position surrounding the forming mold to cause the plastic sheet to be drawn over the contour of the mold.

The heat generated by the heating oven, and the inaccessability of the frame member when it is located thereneath, dictate that the manual lowering of the frame member be done only when the vacuum table and frame member have been moved from beneath the heating oven, and, as a result, the heated plastic has an opportunity to cool somewhat before it is drawn over the mold, thereby decreasing the effectiveness and efficiency of the forming operation.

In addition, since the elevated heating oven is stationary, the upper position of the frame member must be relatively exact with respect to the oven and, consequently, the prior art equipment provides only one predetermined upper position for the frame member at which the vertical posts are locked to prevent human error in positioning the frame member for disposition just beneath the heating oven. Since the frame member, at this upper position, is substantially elevated, some difficulty has been encountered in loading the plastic sheet thereon.

Finally, since the frame member is generally rather large (i.e., 10' x 6' or 6' x 4'), the manual raising and lowering of the frame member has required at least two people and has been comparatively time consuming. The present invention provides plastic forming equipment of this same general type having novel refinements and improvements which substantially eliminate the aforementioned drawbacks and increase the efficiency and effectiveness of the forming operation.

SUMMARY OF THE INVENTION

The apparatus of the present invention is characterized by providing the frame structure with a novel mounting and drive arrangement that permits the frame structure to be automatically raised first to a selected intermediate position just above the forming mold at which position the frame structure is conveniently loaded with a sheet of plastic material, and then automatically raised further to a predetermined upper position at which the sheet of plastic material is at a height suitable for disposing it beneath the elevated heating oven, and, finally, after the sheet has been heated sufficiently by the heating oven, automatically lowered immediately while still under the oven so as to draw the heated sheet over the forming mold. Thus, it will be noted that all of the lowering and raising operations are carried out automatically rather than manually, and that the loading of the frame member is facilitated by the provision of a selected intermediate position for the frame member, and that the sheet of material, as soon as it becomes heated, is drawn over the mold immediately, rather than after removing the frame member and sheet of plastic material from beneath the heating oven as has heretofore been done.

Additionally, in the preferred embodiment of the present invention, the heating oven is arranged with a plurality of individually removable panel structures each having heating elements associated therewith, and is also arranged with control means for energizing selected panel elements whereby the area over which heat is applied to the sheet of plastic material may be selectively varied. Also, the preferred embodiment of the present invention provides at least one cooling fan associated with the heating oven and situated so as to direct a stream of air toward the sheet of material after it has been drawn over the forming mold and moved to a location displaced from the heating oven.

BRIEF DESCRIPTION OF THE DRAWINGS

FIG. 1 is a perspective view of the apparatus for forming plastic material according to the present invention;

FIG. 2 is a perspective view similar to FIG. 1 illustrating the frame member of the forming apparatus at its intermediate position at which it is loaded with a sheet of plastic material;

FIG. 5 is a detailed view illustrating a stop mechanism for holding the frame member in an open position;

FIG. 6 is a horizontal section view of the vacuum table with the forming mold removed therefrom;

FIG. 7 is an end elevation view of the carriage member with the frame member raised to its upper position;

FIG. 8 is an end elevation view similar to FIG. 7 with the frame member at its lower position;

FIG. 12 is a detailed vertical sectional view illustrating a portion of the mounting arrangement for the frame member;

FIG. 13 is a detailed plan view illustrating limit switches which control the movement of the frame member;

FIG. 14 is a related detailed plan view illustrating the limit switches at another position of the frame member.

DESCRIPTION OF THE PREFERRED EMBODIMENT

Figure 3:
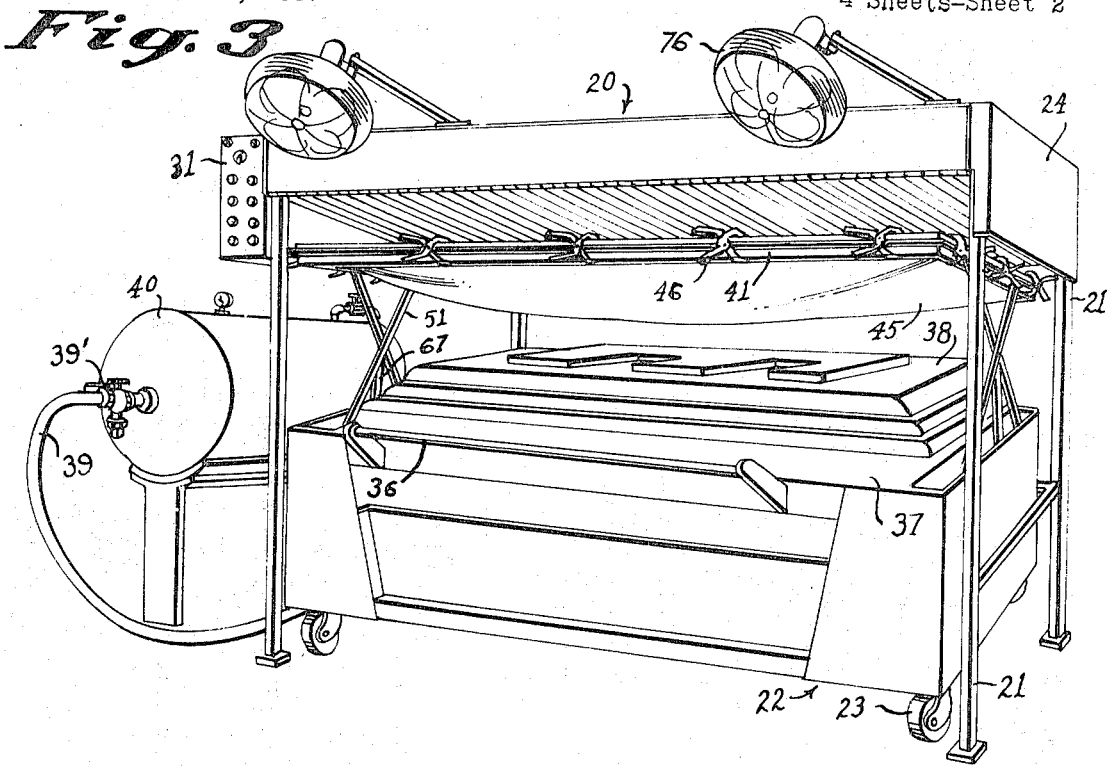
FIG. 3 is a perspective view similar to FIG. 1 illustrating the frame member in its upper position with the sheet of plastic material disposed beneath the heating oven.

Referring now in greater detail to the accompanying drawings, FIG. 1 illustrates apparatus for forming plastic material according to the present invention comprising a heating oven, generally indicated by reference numeral 20, supported at an elevated location by vertical legs 21, and a forming table generally indicated by reference numeral 22 mounted on casters 23 so that the forming table 22 can be easily transported laterally with respect to the heating oven 20 between a location beneath the heating oven 20 (FIGS. 3 and 4) and a location displaced therefrom (FIGS. 1 and 2).

Figure 9:
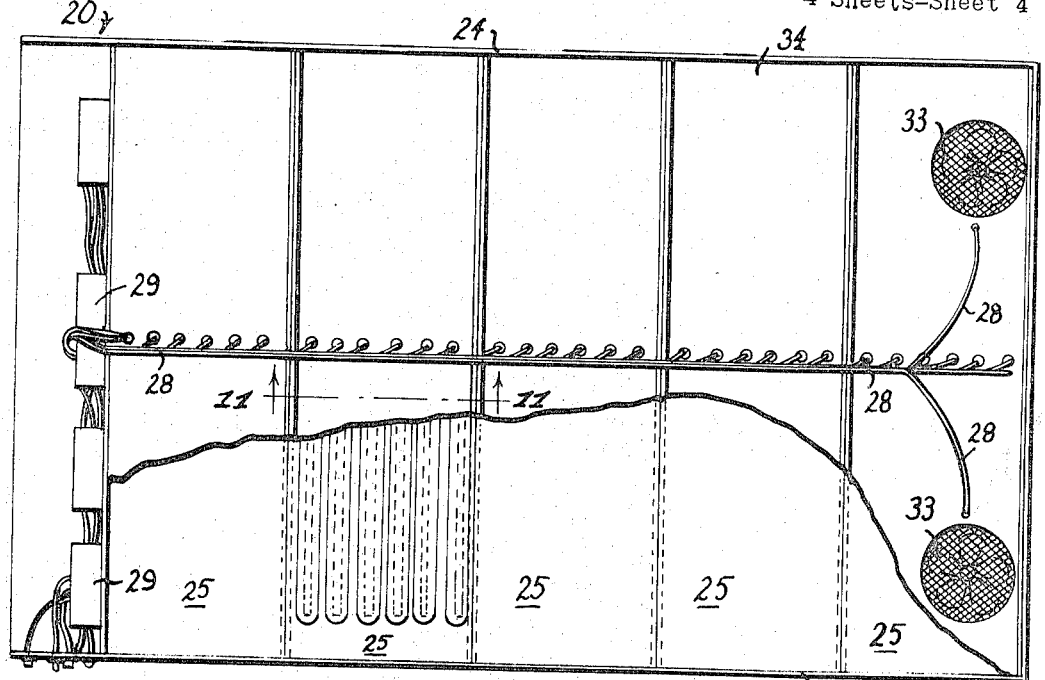
FIG. 9 is a plan view of the heating oven with a portion of the upper wall thereof broken away to expose portions of the heating panels carried thereby.
Figure 10:
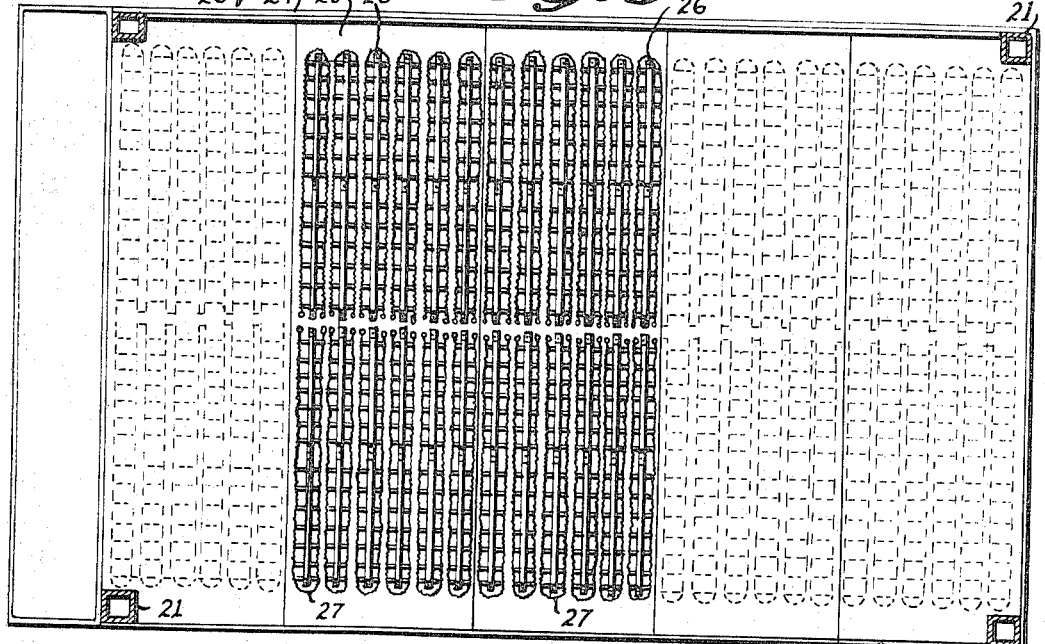
FIG. 10 is a horizontal view of the bottom surface of the heating oven illustrating one of the heating panels in detail.
Figure 11:
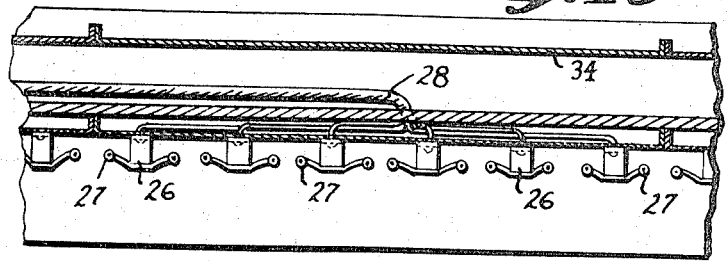
FIG. 11 is a partial vertical sectional view of the oven structure shown in FIG. 10.

As best seen in FIGS. 9, 10, and 11, the heating oven 20 includes a rectangular supporting structure 24 on which rests a plurality of individually removable panel elements 25, each panel element 25 having a series of spaced mounting bars 26 depending therefrom to support electrical heating coils 27 in exposed relation at the underside of the panel elements 25. The heating coils 27 are energized through electrical cables 28 leading from control units 29 located at one side of the heating oven 20 and connected to the individual panel elements 25. In the preferred embodiment of the present invention there are five panel elemests 25, the two outermost panel elements 25 being connected in a common circuit that is controlled by an on-off switch 30 located in control box 31 at the front of the heating oven 20, and the three innermost panels 25 being commonly connected on a separate circuit which is controlled by on-off switch 32 located in control box 31. Thus, if the area to be heated by heating oven 20 is comparatively small, only switch 30 is energized, whereas both switches 30 and 32 are energized if the heating area of all the panels 25 is needed. Control box 31 also includes indicator lights 30' and 32' located just above the switches 30 and 32, respectively, and lighted thereby to provide visual indication that these switches are energized.

The heating oven 20 is also provided with a pair of small exhaust-type fans 33 mounted in the top wall 34 thereof to circulate air through the oven 20 above the panel elements 25 to prevent overheating of the electrical control units 29 and cables 28, the fans 33 being energized by turning on either of the panel control switches 30 and 32 on control box 31.

The aforementioned forming table 22 includes a push bar 36 to facilitate rolling it between the previously discussed locations thereof, and a platform surface 37 on which a desired forming mold 38 is placed as seen in FIG. 1. The platform surface 37 is recessed to provide a conventional vacuum plenum (not shown) disposed beneath the forming mold 38 and closed thereby so that the vacuum will act through a plurality of very small apertures extending vertically through the forming mold 38 to assist in drawing the material to be formed over the forming mold 38 as will be explained in more detail presently. The plenum is evacuated through a hose 39 leading from a vacuum tank 40 and controlled by a manually operated shut-off valve 39' in a conventional manner.

Figure 4:
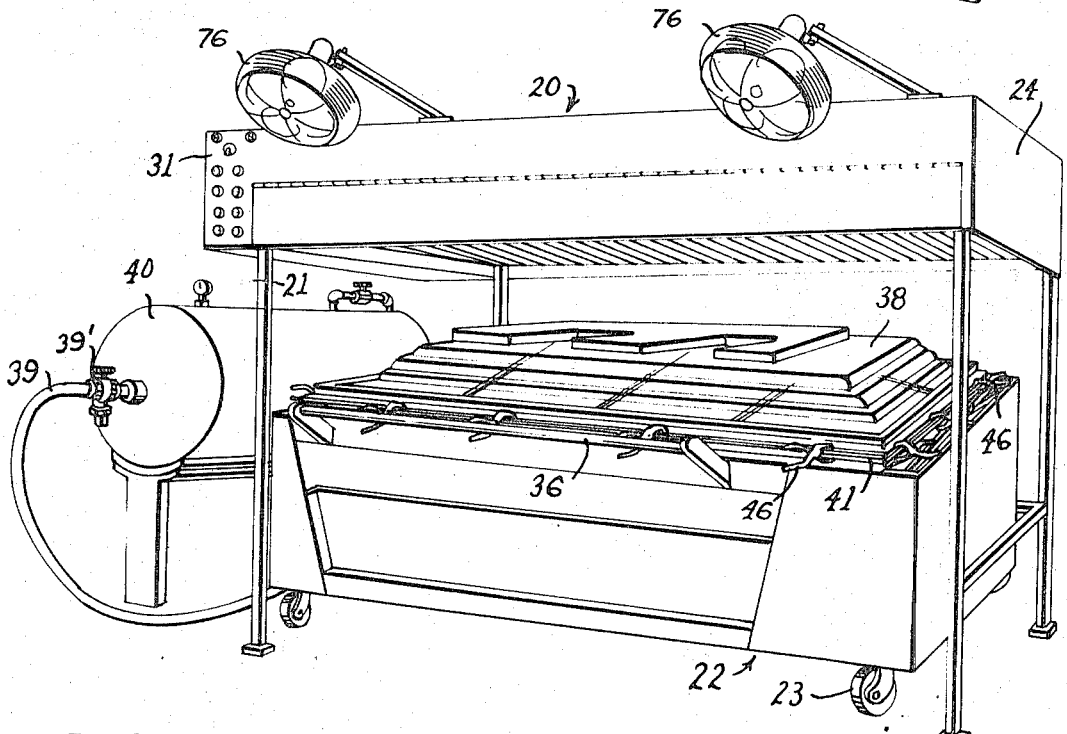
FIG. 4 is a perspective view similar to FIG. 3 in which the frame member is illustrated at its lowered position with the sheet of plastic material drawn over the forming mold.

The plastic material to be formed is supported by an open rectangular frame member 41 that includes a lower supporting element 42 and an upper holding element 43 pivotally secured to the lower support element 42 along one longitudinal side thereof by a hinge 44 (FIGS. 5 and 7) whereby the upper holding element 43 can be raised as seen in FIG. 2 to permit a sheet of plastic material 45 to be placed on lower supporting element 42 after which the upper holding element 43 is clamped tightly over the sheet 45 by a plurality of mechanical clamps 46 as seen in FIG. 3. To facilitate loading the sheet 45 on the frame member 41, the lower supporting element 42 is provided with a stanchion 47 pivotally supported on pin 48 for movement between an active position at which it engages a stud 49 fixed to the upper holding element 43 to maintain the latter in a raised position as seen in FIG. 5, and an inactive position at which the stanchion 47 lies against a stop member 50 provided on the lower supporting element 43.

The frame member 41 is supported for vertical movement with respect to the forming mold 38 by a pair of identical scissor-type linkages 51, each consisting of two links 52, 53 pivotally connected to one another at their respective mid-points by a pivot pin 54. The link 52 is fixed at one of its ends to the forming table 22 by a pivotal connection 55 and carried at its other end by a slide connection 56 on the frame member 41, while the link 53 is fixed at one of its ends to the frame member 41 by a pivotal connection 57 and is carried by its other end by a slide connector 58 similar to the slide connector 56 as best seen in FIGS. 7 and 8. The slide connections 56 and 58 each consist of a fixed channel member 59 and a roller element 60 rotatably carried at the respective ends of links 52 and 53 for containment by the channel member 59 as seen in FIG. 12. As the linkages 51 move between their contracted positions and their expanded positions, the roller elements 60 move within the channel members 59 so as to permit the frame member 41 to remain in a level, horizontal disposition during raising and lowering thereof.

To raise and lower the frame member 41, forming table 22 is provided with an electric motor 61 incorporating gear reduction means and fixed to the table 22 by an attachment plate 62, the motor 61 having a drive shaft 63 extending horizontally from both sides thereof and journaled in bearings 64 carried by the forming table 22. Interconnecting the drive shaft 63 and the frame member supporting linkages 51 is a drive linkage 65 consisting of a first link 66 that is fixed to the drive shaft 63 for rotation therewith, and a connecting link 67 connected between the first link 66 and the mid-point pivot pin 54 of the supporting linkages 51. Thus, as seen in FIGS. 7 and 8, rotation of the drive shaft 63 in a clockwise direction causes vertical extension of the supporting linkages 51 to raise the frame member 41 while rotation of the drive shaft 63 in a counterclockwise direction causes contraction of the supporting linkages 51 to lower the frame member 41.

To control the operation of motor 61 and drive shaft 63, the control panel 31 includes a raising switch 68 that is held in a depressed position to energize motor 61 and raise the frame member 41, and a lowering switch 69 that is held in a depressed position to lower the frame member 41. In addition, the drive shaft 63 is fitted with a pair of eccentric cam portions 70, 71. A pair of cooperating limit switches 72, 73 are mounted on the forming table 22 and have extending arms 74 with rotatable end portions biased into contact with the cam portions 70, 71, whereby the arm 74 of one switch 72 will be moved into its housing and tripped by rotation of the drive shaft 63 and cooperating cam 70 in one direction (FIG. 13), and the arm 74 of the other switch 73 will be moved in a like manner by rotation of the drive shaft 63 in the opposite direction (FIG. 14). The limit switches 72, 73 are connected in circuit with the electric motor 61 in a conventional manner to stop the motor 61 at predetermined rotational positions of the drive shaft 63 and thereby stop the raising and lowering of frame member 41 so that, even with raising switch 68 or lowering switch 69 depressed, the frame member 41 will stop at predetermined upper and lower positions regulated by the coaction of the cam portions 70, 71 with the limit switches 72, 73.

To begin the forming operation, the forming table 22 is moved to a displaced location with respect to the heating oven 20; that is, a location outside the confines of the legs 21 of the heating oven 20 as illustrated in FIG. 1. The frame member 41, which is normally at a position peripherally surrounding the bottom portion of the forming mold 38, is then raised automatically by the pressing switch 68 until the frame member 41 reaches a selected intermediate position at which it is disposed just above the uppermost surface of the forming mold 38 as illustrated in FIG. 2. At this selected intermediate position of the frame member 41, the upper holding element 43 is pivoted about hinge 44 and held in an open position by stanchion 47 engaging the stud 49 to permit the sheet of plastic material 45 to be loaded onto the frame member 41 by placing it on the lower supporting element 42 and returning the upper clamping element 43 to a position over the edges of the sheet of plastic material 45 and after which the clamps 46 are installed to hold the sheet 45 securely in place between the lower supporting element 42 and the upper clamping element 43. It will be noted that the upper surface of the forming mold 38, because of its location just below the plane of the frame member 41, assists in supporting the sheet of plastic material 45 during loading thereof onto the lower supporting element 42.

The switch 68 is then again depressed thereby automatically raising the frame member 41 until it reaches a predetermined upper position whereupon the cam 70 automatically trips the limit switch 72 to terminate further raising of the frame member 41. At this predetermined upper position, the frame member 41 is properly located for disposition just beneath the heating coils 27 of the heating oven 20 when the forming table 22 is moved laterally to its location directly beneath the heating oven 20 as illustrated in FIG. 3. The switches 30 and 32 are then thrown to energize all of the heating coils 27, and a calibrated timer device 75 located on the control panel 31 is set so that it will emit an audible signal when the sheet of plastic material 45 has been subjected to a sufficient quantity of heat to cause it to become plasticized. For example, a heating cycle of 3 minutes and 35 seconds is required to plasticize a .125" thick sheet of plastic material manufactured by Eastman Kodak Co. under the trademark UVEX. As soon as the proper heating cycle is completed, the switch 69 is depressed immediately to lower the frame member 41 automatically until it reaches its initial position surrounding the lower portion of the forming mold 41 at which position the motor 61 is automatically deenergized by the cam portion 71 tripping the limit switch 73. During this lowering of the frame member 41, the plasticized sheet 45 is drawn over the forming mold 38 and caused to conform closely to the contour thereof by the vacuum which is present when valve 39' is opened to connect the vacuum plenum (not shown) in the forming table 22 to the vacuum tank 40.

The forming table 22 is then moved laterally to its location displaced from the heating oven 20, and the formed sheet 45 is allowed to cool. In the preferred embodiment of the present invention, this cooling is facilitated by the provision of cooling fans 76 mounted atop the heating oven 20 and arranged to direct a stream of air in a direction toward the forming table 22 at the displaced location thereof. These fans 76 are conveniently controlled by switches 77 located in the control panel 31.

After the sheet 45 has cooled sufficiently, it is removed from the frame member 41. It has been found that the easiest method of removing the sheet 45 is first to close the valve 39' to terminate the vacuum producing suction and, if desired, to connect the plenum in the forming table 22 to a source of compressed air (not shown), and then to depress the switch 68 to raise the frame member 41 a short distance which separates the sheet 45 from the forming mold 38. The claims 46 are then removed, and the upper holding element 43 is pivoted to its open position and held thereat by stanchion 47, and the sheet 45 is removed from the frame member 41.

It should be noted that while the above-described operation represents the preferred method and apparatus for forming plastic material according to the present invention, there are many changes which could be made without departing from the scope of the present invention. For example, while it is preferable to move the forming table 22 to a displaced location for loading, cooling and unloading of the sheet of plastic material 45, it is within the scope of the present invention to carry out the forming operation without moving the forming table 22 in this manner. That is, the forming table 22 could remain beneath the heating oven 20 throughout the forming operation. Additionally, while the frame member 41 is supported by linkages 51 at only the sides thereof, it may be desired in some installations to provide additional support of the frame member 41 by installing similar linkages at the front and rear thereof.

The present invention has been described above for purposes of illustration only and is not intended to be limited by this description or otherwise except as defined by the appended claim.

I claim:

1. Apparatus for forming plastic material into predetermined configurations comprising heating means mounted in an elevated position on an open support, and a movable carriage member constructed independently of said open support for lateral movement with respect thereto between a first location displaced from said open support and said heating means and a second location within said open support and directly beneath said heating means; said carriage member including a contoured forming mold, an open frame member constructed for removably supporting a sheet of plastic material, said frame member being normally disposed at a position peripherally surrounding the lower portion of said mold and being mounted for movement relative to said mold, and means for automatically moving said frame member between a plurality of positions including raising said frame member from said normal position thereof to a selected intermediate position above said mold for receiving said sheet of plastic material, raising said frame member further and automatically stopping said frame member at a predetermined upper position fixed in relation to said elevated heating means to dispose said sheet directly beneath said elevated heating means and permit heating of said sheet until it becomes plasticized when said carriage member is moved to said second location thereof, and lowering said frame member and automatically stopping said frame member at said normal position thereof surrounding said mold to cause said sheet to adhere to the contour of said mold; and said elevated heating means having at least one cooling fan mounted thereon and arranged to direct a stream of air in a direction toward said displaced location of said carriage member for cooling said sheet of plastic material after said carriage member has been moved thereto following the lowering of said frame member.

(References on following page)

References Cited

UNITED STATES PATENTS

| | | | |
|---|---|---|---|
| 2,377,946 | 6/1945 | Leary. | |
| 2,836,852 | 6/1958 | Butzko | 18—19 |
| 2,907,069 | 10/1959 | Butzko | 18—19 |
| 3,025,566 | 3/1962 | Kostur | 18—19 |
| 3,113,345 | 12/1963 | Butzko | 18—19 |
| 3,121,920 | 2/1964 | Doyle et al. | 18—19X |
| 3,133,314 | 5/1964 | Arnould et al. | 18—19 |
| 3,167,816 | 2/1965 | Howard et al. | 18—19 |
| 3,273,203 | 9/1966 | Ross | 18—19 |
| 3,376,607 | 4/1968 | Brown | 18—19 |
| 2,389,319 | 11/1945 | McMordie et al. | 18—24 |
| 3,153,813 | 10/1964 | Swick. | |
| 3,225,387 | 12/1965 | Angilello et al. | |

J. HOWARD FLINT, Jr., Primary Examiner

U.S. Cl. X.R.

264—322